United States Patent [19]

Dybdal et al.

[11] Patent Number: 5,440,308

[45] Date of Patent: Aug. 8, 1995

[54] APPARATUS AND METHOD FOR EMPLOYING ADAPTIVE INTERFERENCE CANCELLATION OVER A WIDE BANDWIDTH

[75] Inventors: Robert B. Dybdal, Palos Verdes Estates, Calif.; Randolph H. Ott, Albuquerque, N. Mex.

[73] Assignee: The Aerospace Corporation, El Segundo, Calif.

[21] Appl. No.: 13,614

[22] Filed: Feb. 12, 1987

[51] Int. Cl.⁶ ................................................ G01S 7/36
[52] U.S. Cl. ........................................ 342/17; 342/19; 342/375; 455/278.1
[58] Field of Search ................... 342/16, 17, 19, 375, 342/381, 384; 455/278, 296

[56] References Cited

U.S. PATENT DOCUMENTS

| | | | |
|---|---|---|---|
| 3,177,489 | 4/1965 | Saltzberg | 342/381 |
| 3,870,966 | 3/1975 | Miller | 342/16 |
| 4,234,940 | 11/1980 | Iinuma | 342/375 X |
| 4,268,829 | 4/1981 | Baurle et al. | 342/381 X |
| 4,280,128 | 7/1981 | Masak | 342/381 X |
| 4,298,873 | 11/1981 | Roberts | 342/375 |

OTHER PUBLICATIONS

"Analysis of Tapped Delay Line Processing for Adaptive Sidelobe Cancelation"; Larry Bowers et al., 1980 Int. Symp. Digest Antennas & Propagation.

Lambert, Rudduck and Lee, Proceedings, Antenna Measurement Techniques Assn. Meeting, Sep. 28–Oct. 2, 1987, pp. 44–49.

Shan and Kailath, IEEE Transctions on Acoustics, Speech and Signal Processing, vol. ASSP-33, No. 3, Jun. 1985.

Primary Examiner—Tod R. Swann
Attorney, Agent, or Firm—William J. Burke

[57] ABSTRACT

A new adaptive interference technique is disclosed which not only increases the cancellation bandwidth but also reduces the convergence time for the adaptive process. This new technique departs from the prior art in adaptive interference cancellation in that an estimate of the interference arrival direction coupled with a predetermined antenna response is used to establish the weight settings in the adaptive cancellation circuitry. This circuitry incorporates variable true time delay components to achieve interference cancellation over a broad bandwidth with a rapid convergence time.

1 Claim, 2 Drawing Sheets

APPARATUS AND METHOD FOR EMPLOYING ADAPTIVE INTERFERENCE CANCELLATION OVER A WIDE BANDWIDTH

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates in general to the adaptive reduction of electromagnetic interference.

2. Description of the Prior Art

Adaptive interference cancellation techniques dynamically reduce undesirable interference signals in a wide variety of systems including communication systems, radar and sonar.

In a conventional adaptive system, the outputs from several antennas are combined through adaptive circuitry to produce a single input to a receiver. This combination is adjusted dynamically in the presence of interference signals to cancel the interference signal at the receiver input.

The operation of conventional adaptive systems may be interpreted in either the spatial domain or in the circuit domain. In the spatial domain, the adaptive system forms a null in the pattern of the receiving antenna system in the direction of the interference signal. Alternatively, in the circuit domain, the adaptive system adjusts itself to cancel the interference power at the receiver input.

Conventional adaptive interference designs have several shortcomings. One major shortcoming is that effective interference cancellation can be achieved only over a narrow bandwidth. In conventional adaptive interference designs, the output terminals of the antennas are combined with complex amplitude and phase weight settings. The interference signals received by each antenna element experience different amplitude, phase levels and time delays. In addition, these amplitude and phase levels and time delays vary with the direction of the arriving interference.

For very narrow bandwidth signals, these levels and time delays reduce to an aggregate amplitude and phase sum, and the interference can be cancelled by a simple amplitude and weight setting. However, when interference cancellation over a broader bandwidth is required by applications such as high data rate communications or high resolution radar systems, the simple amplitude and phase combination is no longer adequate to cancel interference.

A conventional technique to extend adaptive cancellation bandwidth uses fixed tapped delay line circuitry with amplitude and phase control at each tap, referred to as an "adaptive transversal equalizer," to produce a frequency dependent adaptive weight that extends the cancellation bandwidth of the adaptive cancellation system. However, fixed taps provide only marginal improvements in bandwidth since they do not precisely match the time delays inherent in the antenna system nor their variation with the direction of the arrival of the interference.

A second shortcoming of conventional adaptive interference designs is the time required to determine the adaptive weight settings used in the cancellation circuitry. The conventional adaptive designs use recursive interference correlation techniques or an iterative procedure. In practice, this process is time consuming.

One object of the present invention therefore is to provide adaptive interference cancellation across a broad bandwidth.

A second object of the present invention is to reduce the time required to adaptively cancel interference.

SUMMARY OF THE INVENTION

The invention discloses an apparatus and method for adaptive interference cancellation using variable time delay circuitry, an estimated arrival direction of interference and a predetermined time domain of the antenna system.

DETAILED DESCRIPTION OF THE PREFERRED EMBODIMENT

Wide bandwidth systems, like high data rate communications or high resolution radar systems, require effective cancellation of interference across the entire bandwidth. For example, high data rate communications require wide bandwidths which are available in existing allocations at SHF and EHF frequencies. In these systems, a particularly popular and cost-effective antenna technology is reflector antenna designs. In operation, the reflector antenna receives the desired signal through its main beam, while the interference arrives through the sidelobes of the antennas. Smaller, lower gain antenna elements, referred to as auxiliary elements, are used to sample the interference, and are adaptively combined with the reflector antenna to cancel the interference through the cancellation circuitry. This particular adaptive system design, referred to as a sidelobe canceller, is popular for applications requiring high gain antennas for receiving wide bandwidth signals, and provides an example to illustrate the new time-compensated adaptive technique discussed in the present invention.

Figure 1:
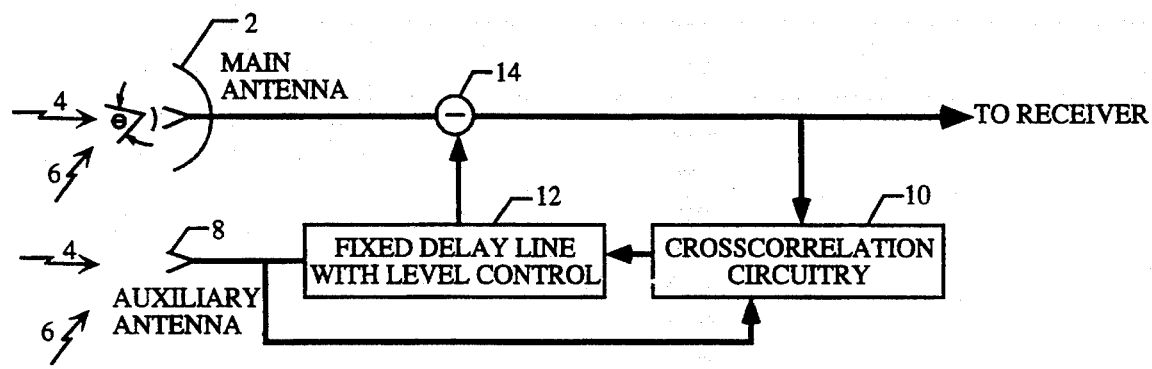
FIG. 1 is a functional block diagram of a conventional adaptive cancellation system.

A functional block diagram of the conventional adaptive sidelobe cancellation system is given in FIG. 1. In operation, the main antenna 2 receives the desired signal 4 through the main beam, and when present, receives interference 6 at a different angle $\Theta$ from the main beam. Adaptive modifications of the antenna pattern produce a null in the direction of the interference and antenna gain in the direction of the interference signal. The elements of the auxiliary antenna 8 also receive the interference signals. The output of the main antenna 2 is cross correlated with the elements of the auxiliary antenna 4 by cross correlation circuitry 10. A finite cross correlation value indicates the presence of interference. The combination of the auxiliary elements is weighted by the adaptive weight setting on the fixed delay line with level control 12 and then subtracted at junction 14 from the output of the main antenna in order to cancel the interference. The adaptive setting on line 12 is adjusted so that this cross correlation product is reduced to zero. The gains of the system are purposely limited so that the adaptive system cannot cancel the desired signal.

Figure 2:
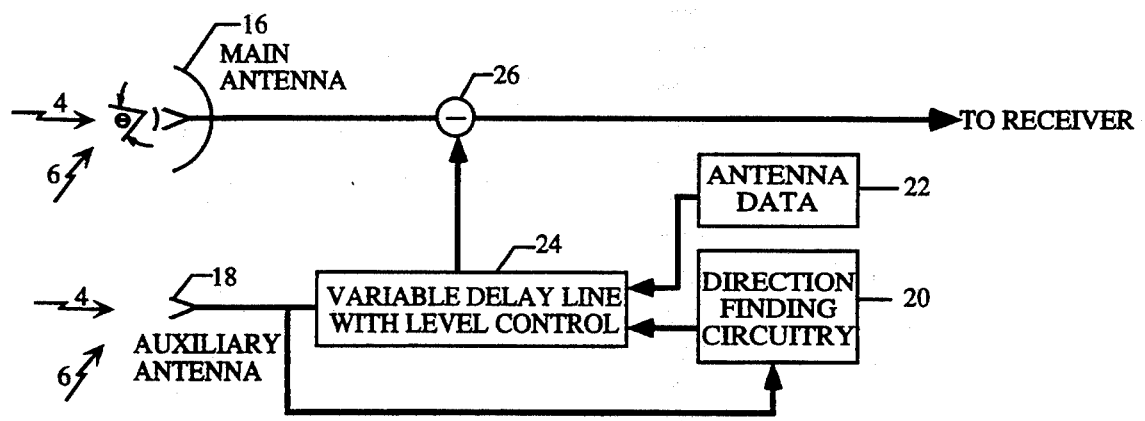
FIG. 2 is a functional block diagram of a time-compensated adaptive cancellation system.

A functional block diagram of the time-compensated adaptive system described in this invention is shown in FIG. 2. The main antenna 16 and auxiliary antenna elements 18 are identical to those used with the conventional techniques. In operation, the direction finding circuitry 20 initially indicates the presence of interference 6 and estimates its arrival direction. The antenna response, consisting of the time delay and levels of the individual radiation mechanism at the estimated interference direction, are looked up in a predetermined antenna data tabulation 22. This data is used to set the delay spacing in the variable time delay components in the adaptive cancellation circuitry as well as the levels at each individual tap spacing on variable delay line 24. The adaptively weighted output is then subtracted at junction 26 from the main antenna output to cancel the interference.

A comparison between the interference rejection of a conventional adaptive technique and the new time-compensated adaptive technique of the present invention has been performed. In this comparison, an offset reflector geometry was selected for the main antenna and small horn antennas were used as auxiliary elements. The conventional technique assumed the adaptive circuitry incorporates a fixed delay line with four taps, each of which has an adaptive weight setting. The interference signal is assumed to be 40 dB higher than the normal system thermal noise level.

Figure 3:
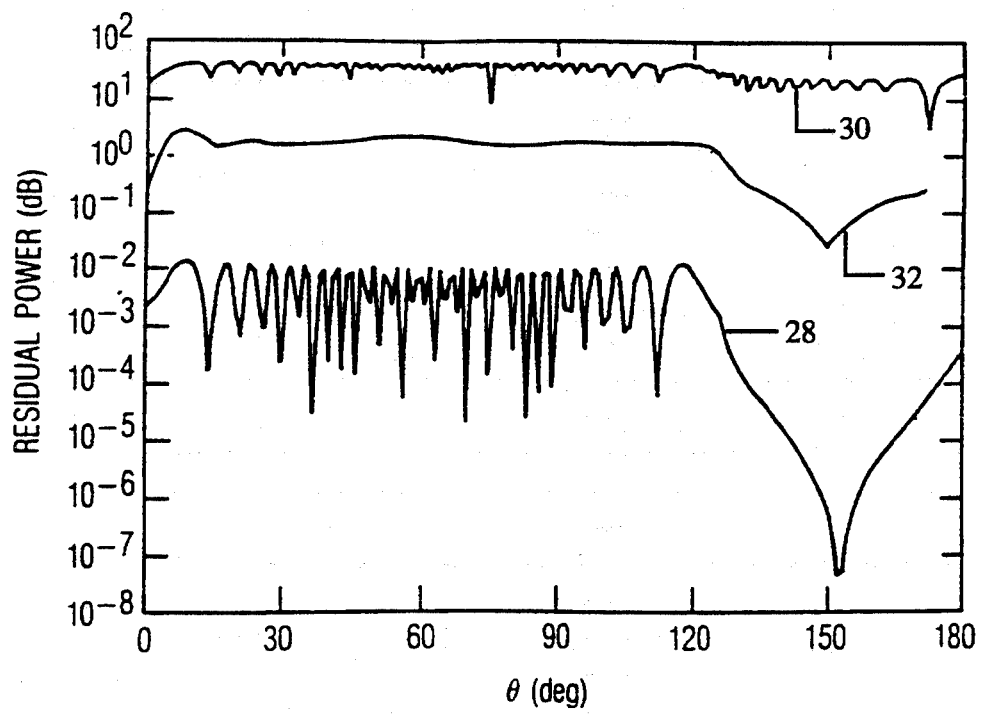
FIG. 3 is a comparison of adaptive interference cancellation performance for a conventional adaptive cancellation circuit and for a time-compensated adaptive cancellation circuit.

Interference rejection was calculated as a function of the interference arrival direction $\Theta$ and includes the residual interference power and the increase in dB in the system noise level created with the adaptive circuitry. FIG. 3 compares the interference rejection P of a conventional technique and the present invention at a center frequency $f_o$ and a frequency 1.1 $f_o$. The interference rejection P of a conventional circuit at the center frequency $f_o$ is shown in curve 28. The interference rejection P of a conventional circuit at a frequency 10 percent higher than the center frequency 1.1 $f_o$ is shown in curve 30. The interference rejection of a time compensated circuitry at a frequency 1.1 $f_o$ is shown in curve 32.

At the center frequency 1.0 $f_o$, the conventional technique as shown in curve 28 performs very well. However, at a 10 percent higher frequency 1.1 $f_o$, a significant amount of interference remains uncancelled as shown in curve 30. For example, FIG. 3 shows that approximately 31 dB remains uncancelled. In contrast, the time compensated adaptive technique as shown in curve 32 shows very good cancellation performance at the 10 percent higher frequency. For example, curve 32 shows that only 1.8 dB remains uncancelled.

This new adaptive technique has several advantages. First, the compensation for the time differences at the specific arrival direction of the interference removes the conventional limitations on the cancellation bandwidth. Second, this technique is not sensitive to changes in the spectral characteristics of the interference at a given direction of arrival since adaptive cancellation is achieved over a wide bandwidth independent of a narrow bandwidth, pulsed, or wide bandwidth noise interference signal. Third, the adaptive weight settings are determined from both the estimated interference direction and the predetermined antenna response in that direction in contrast to the conventional recursive or iterative techniques. Consequently, the time required to establish the adaptive weight settings are reduced from conventional techniques.

While a preferred embodiment of the present invention has been illustrated and described here in a particular manner and in conjunction with communications systems, one skilled in the art will understand that the invention is not limited to the precise construction and applications herein disclosed. The right is reserved therefore to all changes and modifications coming within the scope of the invention.

We claim:

1. Method for dynamically cancelling broadband electromagnetic interference in an antenna system composed of a primary antenna and an auxiliary antenna comprising the steps of:
   predetermining the time-domain response of the antenna system as a function of direction of the interference prior to cancelling said interference and storing the levels and time delays of the antenna system response for subsequent recall;
   estimating the direction from which the interference is arriving;
   recalling the levels and time delays of the antenna system response from the memory device for the direction of the interference previously estimated;
   adjusting the levels and time delays of the multiple tap, variable delay components in an adaptive cancellation circuit connected to the auxiliary antenna in a manner that duplicates the time-domain response of the antenna system in the specific direction estimated for the interference and processing an appropriate interference signal;
   subtracting the interference signal processed by the adaptive cancellation circuit from the interference received by the antenna system, thereby cancelling the interference over a broad bandwidth in a rapid, non-recursive manner.

* * * * *